No. 775,586. PATENTED NOV. 22, 1904.
E. THOMSON & A. A. BALL, Jr.
VALVE MECHANISM.
APPLICATION FILED MAY 25, 1903.
NO MODEL. 4 SHEETS—SHEET 1.

WITNESSES: INVENTORS:
Elihu Thomson,
Augustus A. Ball, Jr.

No. 775,586. PATENTED NOV. 22, 1904.
E. THOMSON & A. A. BALL, Jr.
VALVE MECHANISM.
APPLICATION FILED MAY 25, 1903.
NO MODEL. 4 SHEETS—SHEET 2.

WITNESSES:
Harry M. Tilden
Edward Williams, Jr.

INVENTORS:
Elihu Thomson,
Augustus A Ball, Jr.
by Albert ... Atty.

No. 775,586. PATENTED NOV. 22, 1904.
E. THOMSON & A. A. BALL, Jr.
VALVE MECHANISM.
APPLICATION FILED MAY 25, 1903.
NO MODEL. 4 SHEETS—SHEET 3.

WITNESSES: INVENTORS:
Harry N. Tilden. Elihu Thomson,
Edward Williams, Jr. Augustus A Ball, Jr.
by Albert G. Davis Atty.

No. 775,586. PATENTED NOV. 22, 1904.
E. THOMSON & A. A. BALL, Jr.
VALVE MECHANISM.
APPLICATION FILED MAY 25, 1903.
NO MODEL. 4 SHEETS—SHEET 4.
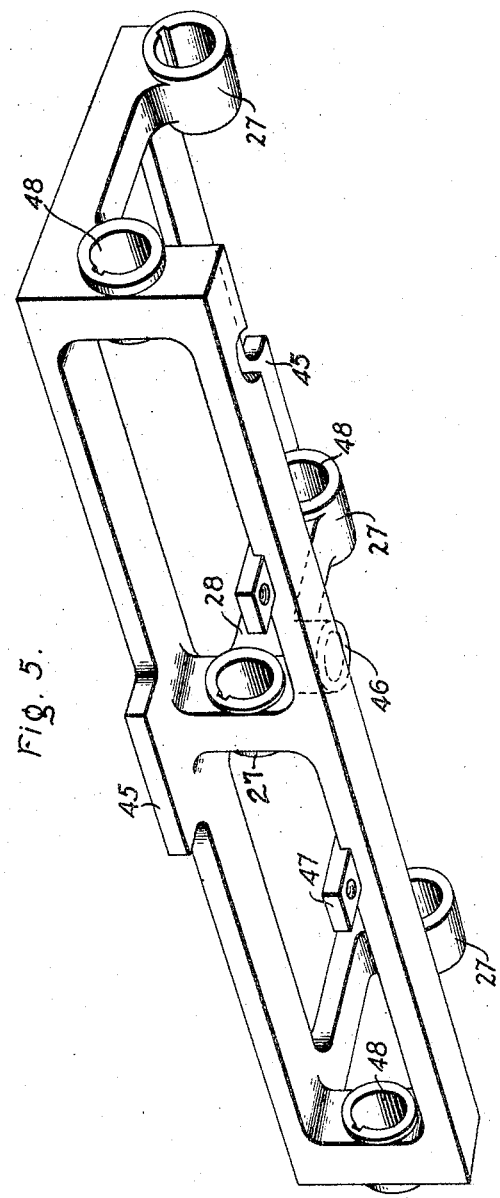
WITNESSES.
INVENTORS.
Elihu Thomson.
Augustus A. Ball, Jr.

No. 775,586.

Patented November 22, 1904.

UNITED STATES PATENT OFFICE.

ELIHU THOMSON, OF SWAMPSCOTT, AND AUGUSTUS A. BALL, JR., OF LYNN, MASSACHUSETTS; SAID THOMSON ASSIGNOR TO GENERAL ELECTRIC COMPANY, A CORPORATION OF NEW YORK.

VALVE MECHANISM.

SPECIFICATION forming part of Letters Patent No. 775,586, dated November 22, 1904.

Original application filed May 19, 1902, Serial No. 107,915. Divided and this application filed May 25, 1903. Serial No. 158,565.

(No model.)

*To all whom it may concern:*

Be it known that we, ELIHU THOMSON, residing at Swampscott, and AUGUSTUS A. BALL, Jr., residing at Lynn, county of Essex, State of Massachusetts, citizens of the United States, have invented certain new and useful Improvements in Valve Mechanism for Elastic-Fluid Engines, of which the following is a specification.

This is a division of our prior pending application, Serial No. 107,915, filed May 19, 1902, which division is made at the requirement of the United States Patent Office under the provisions of Rules 41 and 42.

The present invention has for its object to improve and simplify the construction of the valve mechanism of elastic-fluid engines, and more especially those of the puppet type, whereby the valve-actuating means are rendered more accessible and their action more certain.

For a consideration of what we consider to be novel and of our invention reference is made to the specification and claims appended thereto.

Figure 1:
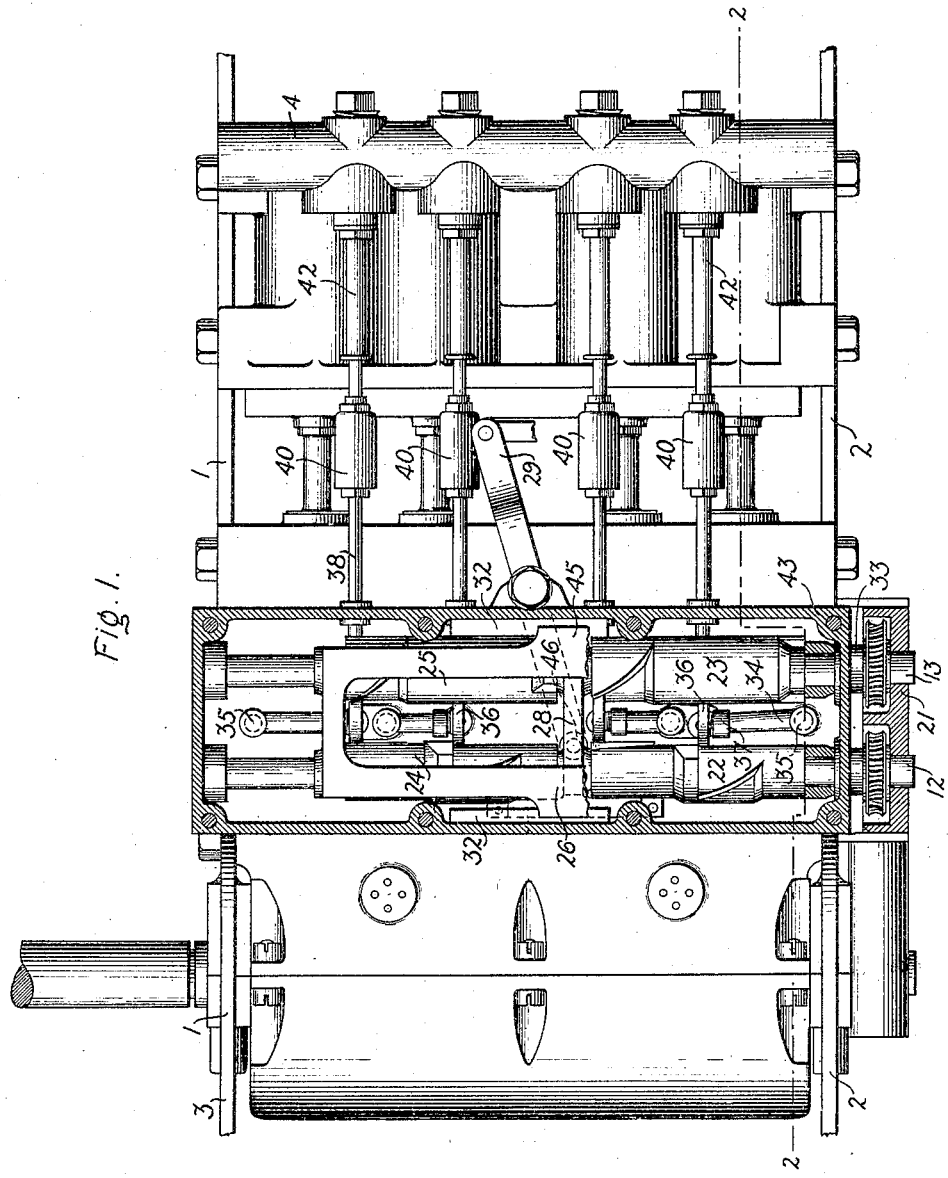
Figure 2:
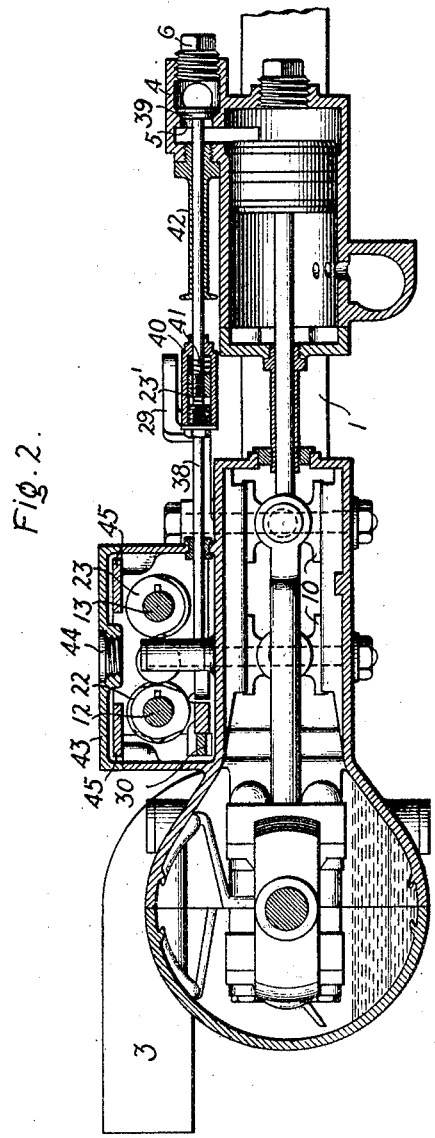
Figure 3:
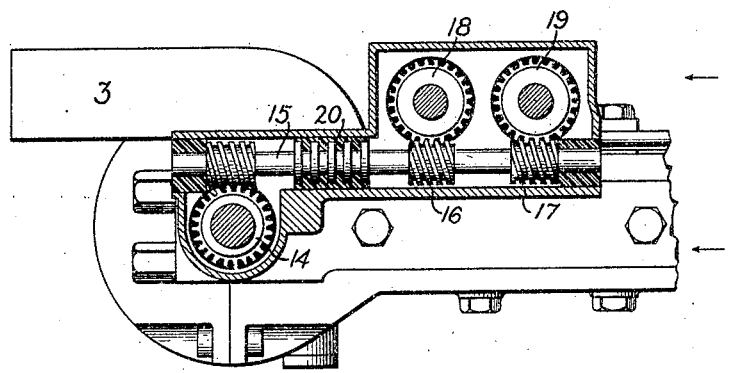
Figure 4:
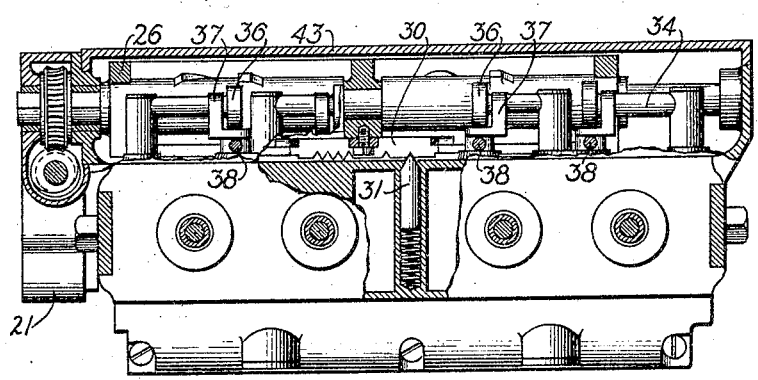

In the accompanying drawings, which represent one embodiment of our invention, Figure 1 is a plan view of a four-cylinder single-acting engine with certain of the parts in section to illustrate the valve-operating mechanism. Fig. 2 is a longitudinal section on line 2 2 of Fig. 1. Fig. 3 is a partial side elevation with certain of the parts in section. Fig. 4 is a cross-section showing the means employed to actuate the valve mechanism, and Fig. 5 is a perspective view of the cam-shifting cage.

Referring more particularly to Figs. 1 and 2, the reference-numerals 1 and 2 represent side plates or supports which hold the parts of the engine together, and 3 is an extension which forms a support for the same. Formed integral with the cylinders at one end is a steam-chest 4, and in this steam-chest are valve-openings 5, Fig. 2, leading to the cylinder. Opposite each of the admission-valves is a screw-threaded plug 6, by means of which the valve may be inspected or removed.

Referring particularly to Fig. 1, 12 and 13 are parallel cam-carrying shafts which are driven by means of spiral gears. (Best shown in Fig. 3.) The shafts, with their attached cams and coöperative devices, are situated on top of the engine, where they can be readily reached for the purpose of inspection and repair. They are also so situated that they can be readily lubricated. In order to drive these shafts in synchronism with the main crankshaft, a spiral gear 14 is mounted on said shaft, which in turn meshes with a spiral gear carried on the intermediate shaft 15, the latter extending parallel with the engine piston or pistons. On the right-hand end of the shaft are spiral gears 16 and 17, which drive the spiral gears 18 and 19. The gear 18 drives the cam-shaft 12, while the gear 19 drives the cam-shaft 13. The intermediate shaft 15 is mounted in suitable end bearings and at a point midway between the ends is provided with a thrust-bearing 20, composed of a plurality of rings or projections engaging with corresponding fixed projections. The gears are inclosed in a detachable casing 21, which casing receives lubricant from the main-crank case and also from the casing containing the valve mechanism.

The cam-shafts 12 and 13 extend parallel with the crank or main shaft and are provided with keys on which are splined four cams 22, 23, 24, and 25. These cams are employed to control the admission of steam to the cylinders and are arranged to positively open the valves and under normal conditions to close them. In order to shift the cams for the purpose of changing the cut-off and also the direction of rotation, a cage 26 is provided, which has extensions 27, having openings 48 to receive the shafts 12 and 13. The cage is provided at the center with a bridge-piece 28, and pivotally secured thereto at 46 is a lever 29, which lever is also pivotally secured to the engine-case and is actuated by any suitable means. In order that the cams may occupy certain fixed positions on the driving-shafts 12 and 13 for different speeds or duty of the engine, a step-by-step device is provided, Fig. 4, comprising a notched plate 30, which is bolted to lugs 47, formed on the reciprocating cage 26, and a spring-pressed plunger 31, carried by the crank-case, that enters the notches formed in the plate. By reason of this construction the longitudinal position of the cams with respect to the driving-shafts and rollers for the valve-actuating means can be held in definite position. In order to assist in assembling the parts and also to guide the cage, lugs 45 are formed on opposite sides of the cage and are in engagement with the guides 32, Fig. 1. These guides are secured to the case in any suitable manner. The cam-shafts 12 and 13 are provided with bushings 33 where they pass through the wall of the case surrounding the cams.

Situated between the cams are pivoted roller-carrying arms for actuating the puppet-valves, two arms being provided for each pair of cams. The construction and operation of the cams and rollers being similar in each set, a description of one of them will suffice. 34 represents an arm which is pivotally supported by a bolt 35, Figs. 1, 2, and 4, which passes through the crank-case and is provided with a nut on the under side. The bolts passing through the intermediate portion of the case are surrounded by a wall of metal, which prevents the sides of the case from collapsing in case undue pressure is applied to the nuts. On the end of each pivoted arm is a roller 36, which engages with the cams situated on opposite sides thereof. The part of the arm between the point of pivot and the roller 36, Fig. 4, is L-shaped, as shown at 37, and is connected to the valve-actuating rod 38. As the arm 34 is swung from side to side, due to the action of the cams 23 and 24, the valve-rod 38 is moved longitudinally in a manner to actuate the steam-admitting valve 39, Fig. 2.

Referring to Fig. 2, the construction and arrangement of the valve-operating rod will be described. The rod proper consists of two parts movable with respect to each other and united by a holder 40. The holder is screw-threaded to the end of the left-hand portion of the rod and is arranged to surround the end of the other portion of the rod. On the end of the second part of the rod or valve-stem proper is a nut 23', and between this nut and the holder is a stiff compression-spring 41. The head is provided with a hardened projection of reduced size where it engages with the head of the other portions of the rod, which head is also hardened in order to prevent it from spreading out and interfering with the operation of the valve. Surrounding the right-hand end of the valve-stem is a long tubular sleeve 42, which is screw-threaded to the cylinder-case. This sleeve being long permits of a certain amount of condensation of steam at this point and prevents leaking. It will be thus seen that we avoid the use of objectionable packings. The object of the spring connection between the two parts of the rod is to insure the complete seating of the valve 39, even though the relation of the parts is somewhat disturbed due to heating. The valve 39 is of the puppet type and is arranged to cover and uncover the opening leading into the cylinder. In the ordinary operation of the engine it is positively opened and closed, yet by reason of the compression-spring 41 can open and relieve the compression in the cylinder-space whenever it is excessive.

The action of the valve mechanism is as follows: Assuming that the parts are in the position shown in Figs. 1 and 2, as the cams 22 and 23 are revolved the arm 34 is moved by the cam-roller 36 first in one direction then in the other, thus imparting longitudinal movement to the valve-rod 38. As the rod moves to the right the valve 39 is lifted, owing to the engagement between the two parts of the rod or stem within the holder 40. When the rod is moved in the opposite direction or to the left, so long as the tension on the rod does not exceed that of the spring the two parts of the rod move together; but as soon as the valve 39 is seated the remaining movement of the left-hand end of the valve-stem compresses the spring 41. It will be noted that the cams 22 and 23 are tapered, and by shifting their position along the shafts 12 and 13 with respect to the valve-operating rollers 36 the admission and cut-off of the steam to the cylinder can be varied. This shifting of the cam is accomplished by means of the lever 29, which may be under the control of the automatic governor or may be governed manually as occasion demands. The particular engine shown being more especially designed for automobile-work, wherein it is desirable to operate at different speeds, the shifting of the cams through the cage 26 is accomplished by a manually-actuated lever.

The valve-actuating cams and the parts directly coöperating therewith are mounted in a fluid-tight case 43, which is preferably filled to a greater or less extent with a lubricating material. Lubricant may be admitted to the case by removing the screw-threaded plug 44.

According to the provisions of the patent statutes, we have described the principle of operation of our invention, together with the apparatus which we now consider to represent the best embodiment thereof; but we desire to have it understood that the apparatus shown is only illustrative and that the invention can be carried out by other means.

What we claim as new, and desire to secure by Letters Patent of the United States, is—

1. In an engine, the combination of a piston, a cylinder, a puppet-valve for admitting steam to the cylinder, a two-part valve-rod for positively opening and closing the valve, and a yielding device included in said rod which permits the valve to open under a predetermined compression.

2. In an engine, the combination of a piston, a cylinder, a puppet-valve for admitting steam to the cylinder, cams for positively opening and for positively closing the valve under normal conditions, and a spring between the cams and the valve which permits the latter to open under excessive compression.

3. In an engine, the combination of a piston and cylinder, a crank-shaft, a cam, an outwardly-opening valve of the puppet type for admitting vapor to the engine, a two-part valve-rod for positively opening and closing the valve, and a spring-coupling for the rod by means of which the valve is permitted to open irrespective of the position of the actuating means whenever the back pressure in the cylinder exceeds a certain definite amount.

4. In an engine, the combination of parallel shafts, valve-actuating cams which are driven thereby, an arm pivoted between the cams and carrying a roller at its end, and a valve-actuating rod which is secured to the pivoted arm.

5. In an engine, the combination of a pair of cams, a roller which is located between the cams and is acted upon by them, a valve that is positively opened and positively closed by the cams under normal conditions, and a spring-coupling between the roller and the valve whereby the seating of the valve is assured, at the same time permitting it to open in case the back pressure on the cylinder exceeds a predetermined amount.

6. In an engine, the combination of cam-carrying shafts, rolls located between and acted upon by the cams, a cage for moving the cams on the shaft in order to modify the action of the valves, pivoted arms for carrying the rolls, two-part valve-rods connected to the rolls, and a spring-coupling in each of the rods.

7. In an engine, the combination of a pair of shafts, cams mounted thereon, roll-carrying arms situated in operative relation to the cams, a cage for moving the cams with respect to the rolls, and a guide for directing the movements of the cage.

8. In an engine, the combination of a piston and cylinder, a vapor-admitting valve, cams for operating the valve, a cage for shifting the cams for the purpose of changing the cut-off, and a step-by-step mechanism by means of which the cage can be made to assume definite positions.

9. In an engine, the combination of a pair of parallel shafts, two sets of cams mounted thereon, a cage for simultaneously shifting all of the cams, a bridge-piece for connecting the sides of the cage, and an operating-lever which is connected to the bridge-piece.

10. In an engine, the combination of a main shaft, a piston and cylinder, cam-carrying shafts, gearing between the main and the cam-carrying shafts, a thrust-bearing located between the main shaft and the cam-shafts, and a sectional fluid-containing casing which surrounds the shafts and cams, the several sections being arranged to communicate with each other.

11. In an engine, the combination of a piston and cylinder, an admission-valve, an exhaust-port, a crank that is connected to the piston, a crank-shaft, a cam for actuating the admission-valve, a shaft that extends parallel with the crank-shaft for actuating the cam, an intermediate shaft that extends between the crank and cam shafts, and gearing for transmitting motion from one shaft to the other.

12. In an engine, the combination of a piston and cylinder, a crank, a cam-shaft, a closed crank-case, a box on top of the crank-case containing cam-operating mechanism, puppet-valves, an intermediate shaft above the main crank and below the cam-shaft, and gearing for actuating the cam-shaft.

In witness whereof we have hereunto set our hands this 18th day of May, 1903.

ELIHU THOMSON.
   AUGUSTUS A. BALL, Jr.

Witnesses:
  DUGALD McK. McKILLOP,
  JOHN J. WALKER.